United States Patent
Cyr et al.

(10) Patent No.: US 10,181,119 B2
(45) Date of Patent: Jan. 15, 2019

(54) METHODS AND SYSTEMS FOR SELF-SERVICE CHECKOUT

(71) Applicant: MasterCard International Incorporated, Purchase, NY (US)

(72) Inventors: Michael Cyr, New Milford, CT (US); David Brown, Dardenne Prairie, MO (US)

(73) Assignee: Mastercard International Incorporated, Purchase, NY (US)

(*) Notice: Subject to any disclaimer, the term of this patent is extended or adjusted under 35 U.S.C. 154(b) by 530 days.

(21) Appl. No.: 14/662,498

(22) Filed: Mar. 19, 2015

(65) Prior Publication Data

US 2015/0193763 A1 Jul. 9, 2015

Related U.S. Application Data

(63) Continuation of application No. 13/594,470, filed on Aug. 24, 2012, now abandoned.
(60) Provisional application No. 61/527,226, filed on Aug. 25, 2011.

(51) Int. Cl.
| | |
|---|---|
| *G06Q 20/20* | (2012.01) |
| *G06Q 20/32* | (2012.01) |
| *G06Q 20/18* | (2012.01) |
| *G06Q 30/06* | (2012.01) |
| *G06Q 20/40* | (2012.01) |

(52) U.S. Cl.
CPC ......... *G06Q 20/3224* (2013.01); *G06Q 20/18* (2013.01); *G06Q 20/202* (2013.01); *G06Q 20/204* (2013.01); *G06Q 20/3223* (2013.01); *G06Q 20/20* (2013.01); *G06Q 20/40* (2013.01); *G06Q 30/06* (2013.01)

(58) Field of Classification Search
CPC .............................. G06Q 30/06; G06Q 20/20
See application file for complete search history.

(56) References Cited

U.S. PATENT DOCUMENTS

| | | | |
|---|---|---|---|
| 6,386,448 B1 * | 5/2002 | Addy | G07G 1/0036 235/378 |
| 7,680,702 B1 * | 3/2010 | Oakes, III | G06Q 30/06 705/26.1 |
| 2003/0055785 A1 * | 3/2003 | Lahiri | G06Q 20/04 705/41 |
| 2009/0063624 A1 * | 3/2009 | Nordstrom | H04M 1/72525 709/203 |

(Continued)

*Primary Examiner* — A Hunter Wilder
(74) *Attorney, Agent, or Firm* — Buckley, Maschoff & Talwalkar LLC

(57) ABSTRACT

Methods and systems for self-service checkout. In an embodiment, a mobile device processor of a consumer's mobile device receives input data of an item selected for a purchase transaction, displays information concerning the item on a display screen, and receives an indication from a consumer that shopping is completed. The method includes transmitting checkout data for the purchase transaction to a self-service checkout computer, receiving a transaction authorization message and merchant instructions from the self-service checkout computer, and then displaying on the display screen the transaction authorization message and the merchant instructions, wherein the merchant instructions direct the consumer to exit the particular merchant store in a particular manner.

17 Claims, 5 Drawing Sheets

(56) References Cited

U.S. PATENT DOCUMENTS

2010/0299212 A1* 11/2010 Graylin .................. G06Q 20/32
                                                            705/14.66
2011/0251892 A1* 10/2011 Laracey ............. G06Q 30/0253
                                                            705/14.51
2012/0095853 A1*  4/2012 von Bose ............... G06Q 20/20
                                                               705/16

* cited by examiner

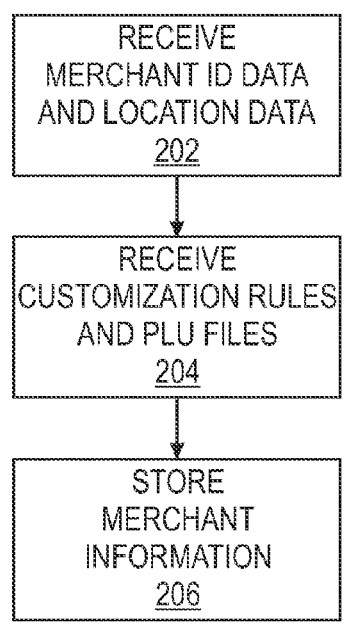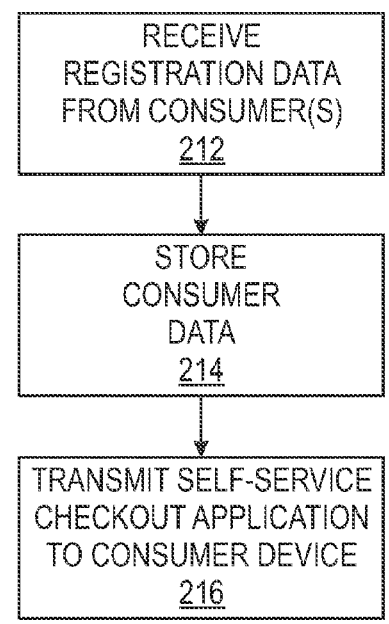
FIG. 2A
FIG. 2B

METHODS AND SYSTEMS FOR SELF-SERVICE CHECKOUT

CROSS REFERENCE TO RELATED APPLICATION

This application is a continuation of U.S. patent application Ser. No. 13/594,470 entitled "METHODS AND SYSTEMS FOR SELF-SERVICE CHECKOUT" filed on Aug. 24, 2012, which claims the benefit of U.S. Provisional Patent Application No. 61/527,226, filed on Aug. 25, 2011, which applications are incorporated herein by reference for all purposes.

BACKGROUND OF THE INVENTION

Mobile telephones and other mobile communications devices (such as personal digital assistants, laptop computers, tablet computers, and the like) are carried by millions of consumers. Thus, attempts have been made to integrate payment applications with these mobile devices so that consumers can use them to purchase goods and/or services from merchants. Thus far, however, the available mobile device payment applications have not been widely accepted by merchants because some providers require the merchants to purchase and/or install specialized hardware and/or software in order for the applications to function. In addition, some available mobile payment solutions are not compatible with existing merchant inventory and/or merchant payment systems, requiring merchants to perform a complicated and expensive overhaul of their existing inventory and payment systems in order to offer consumers the option to utilize mobile devices to provide payment.

From the point of view of consumers, since existing mobile payment applications have not been widely accepted by merchants (at least in the United States), there does not seem to be a need to sign-up for and install such payment applications on their mobile devices. Furthermore, since many of the current mobile device applications are complicated to install and use in a retail environment, consumers have not been widely adopting such mobile device payment applications.

Thus, there is a need for systems, apparatus and processes for facilitating mobile device payments from the perspective of both merchants and consumers. In addition, there is a need for providing an intuitive and/or modified shopping experience for consumers shopping in a merchant's store who wish to use their mobile devices to both select items and to purchase those items.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, wherein:

FIG. 2A is a flowchart illustrating a self-service checkout merchant registration process according to an embodiment of the invention;

FIG. 2B is a flowchart illustrating a self-service checkout customer registration process according to an embodiment of the invention;

DETAILED DESCRIPTION

Figure 1:
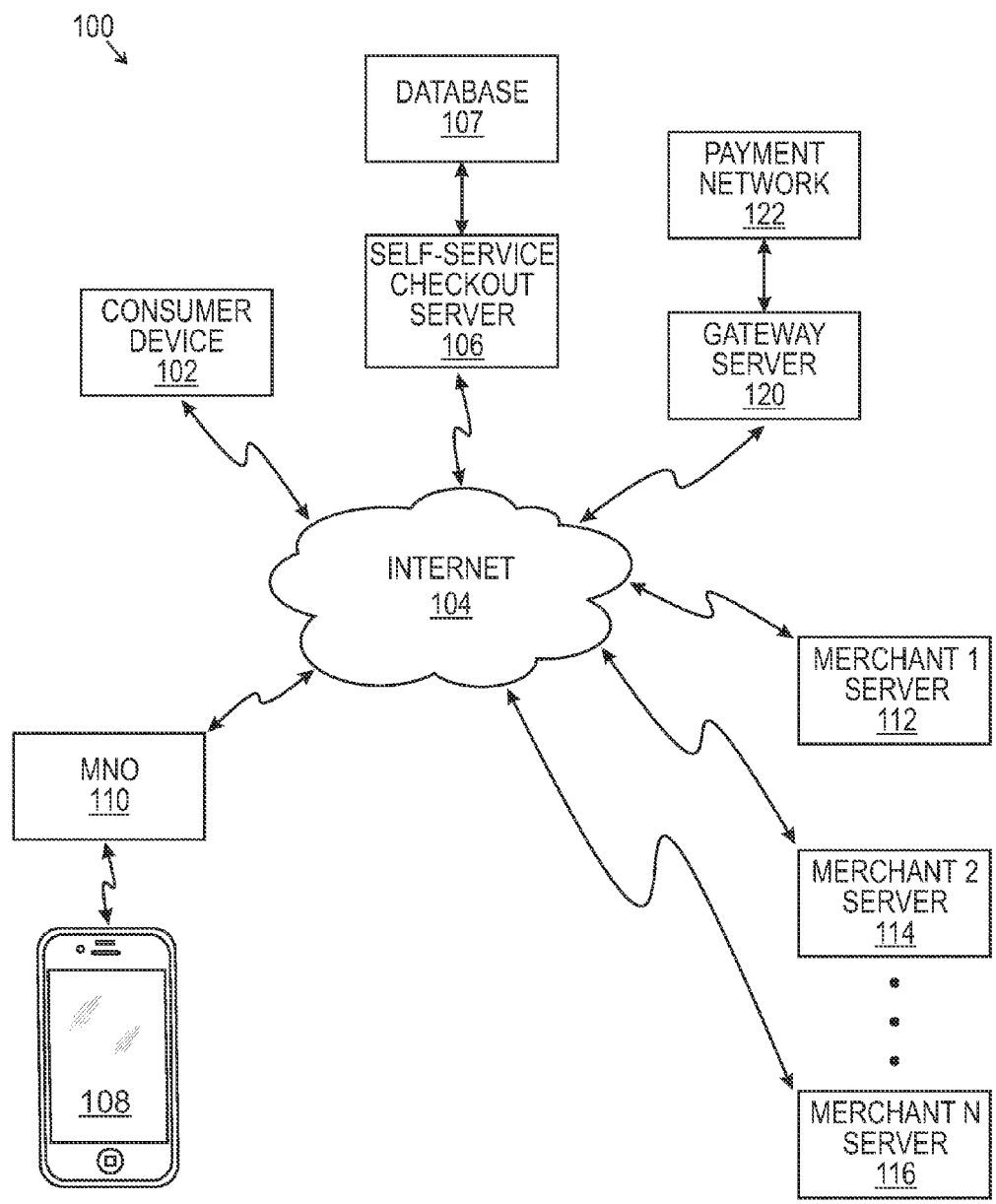
FIG. 1 is a block diagram illustrating a self-service checkout system according to an embodiment of the invention.

In general, and for the purpose of introducing concepts of the embodiments described herein, systems, apparatus and methods are disclosed for providing self-service checkout to consumers utilizing a mobile device to shop in a merchant's store. In an embodiment, a system includes a self-service checkout server computer, a gateway server operably connected to the self-service checkout server computer and to a payment network, a consumer mobile device and a plurality of merchant server computers. The self-service checkout computer can receive and store merchant registration data and consumer registration data, and provides a self-service checkout application to the mobile device for use by the consumer when shopping at the merchant's store. The self-service checkout computer receives checkout data from the consumer mobile device that includes merchant identity data, transaction details and payment account data, and transmits that information to a gateway server for payment processing (purchase transaction authorization). In some embodiments, the transaction details and payment account data are instead transmitted to a merchant server for purchase transaction authorization. The self-service checkout computer then receives either a purchase transaction authorization or a transaction denied indication, and transmits either a purchase transaction authorization message or a purchase denied message to the consumer for display on a display screen of the mobile device. In some embodiments, if a purchase denied message is displayed then a prompt is also displayed for the consumer to provide alternate payment account information in order to again try to purchase the items the consumer selected while shopping at the merchant's store.

Another aspect concerns initializing the self-service checkout application by a processor of the consumer's mobile device by recognizing that the consumer mobile device has been transported to the merchant's store. The consumer then uses his or her mobile device to provide input data concerning at least one item selected for purchase, which is then displayed as a virtual shopping cart list on a display screen of the consumer mobile device. When an indication is received that the consumer is finished shopping, the mobile device transmits the transaction details and payment account data to a self-service checkout computer. The mobile device then receives either a transaction authorization message or a transaction denied message, and displays whichever message is received on the display screen of the mobile device.

The self-service checkout system, apparatus and methods permits merchants the opportunity to provide relevant product data and rules to a self-service checkout computer, which can be used to facilitate and enhance a consumer's shopping experience. The shopping experience is enhanced as the consumer adds items to a virtual shopping cart that may be displayed on a display screen of his or her mobile device in conjunction with selecting the item at the store and placing it in a physical shopping cart. An intuitive mobile device application is provided to the consumer for use with his or her mobile device to load a virtual shopping cart while shopping in the merchant's store, and the same mobile device application can be used to easily and quickly checkout (purchase the items) without having to queue up in a line behind other consumers making purchases at a checkout counter.

FIG. 1 is a block diagram illustrating a self-service checkout system 100 according to an embodiment that provides a modified and intuitive shopping experience for consumers shopping at a merchant retail store. In an implementation, a consumer utilizes a mobile device 102 capable of wireless communications, such as a mobile telephone, personal computer or a tablet computer (such as an iPad™), to operably connect to a self-service checkout server 106 via the Internet 104. (In some implementations, however, the mobile device 102 could be connected to the Internet 104 via a wired connection.) The self-service checkout server 106 may be operably connected to one or more databases 107 and may host, for example, a self-service checkout website that may be accessed by both consumers and merchants. Also depicted is a smartphone 108 operable for communications via a mobile network operator (MNO) 110 with the self-service checkout server 106 via the Internet 104. Also shown in FIG. 1 are a merchant1 server 112, merchant2 server 114, merchantN server 116 (which represent a plurality of merchant computing devices), and a gateway server 120 that are all also operably connected to the self-service checkout server 106 via the Internet 104. In this implementation, the gateway server 120 (which may be a central server) is also connected to a payment network 122. It should be understood that network connections other than through the Internet 104 may be utilized between various components of the system 100, which may depend on, for example, data security concerns. For example, the merchant servers 112, 114 and 116 may be operably connected (wirelessly or via a network, for example) via a secure connection directly to the gateway server 120 instead of to the Internet. In this case, the gateway server controls communications to and from the merchant servers 112, 114 and 116.

FIG. 2A is a flowchart illustrating a self-service checkout merchant registration process 200 according to an embodiment. In some embodiments the self-service checkout server 106 provides a merchant registration web page (not shown) for use by merchants to register with the self-service checkout service. Thus, merchants may utilize an Internet-connected device (such as a laptop computer or a desktop computer, and the like) to navigate to a self-service checkout website and to register by providing information to the self-service checkout service. In some embodiments, the self-service checkout server 106 receives 202 merchant registration data that includes merchant identification data and store location data that includes details concerning the merchant's shopping locations. The merchant may provide geographic data such as addresses and/or latitude and longitude information for one or more retail locations (the latitude and longitude data may be useful, for example, for providing store location data to a global position system (GPS) application resident on a consumer's mobile device). The self-service checkout server 106 also receives 204 mobile application customization rules that apply to one or more of the retail stores. For example, a merchant may provide rules or a rule that prevents consumers from purchasing merchandise by weight and/or per unit. For example, a supermarket merchant may provide such a rule that applies to food products such as fresh produce, meat products, seafood products, and the like. In addition, some merchants may provide product data such as price look-up (PLU) codes associated with various items offered for sale in that merchant's retail stores. In some embodiments, merchants may also provide detailed pricing data associated with particular items for sale, and may provide item details along with a Stock-Keeping Unit (SKU) number that can be used to perform a lookup in a database, for example, when a barcode is scanned by a consumer during shopping. In some implementations, a file upload from a merchant device may be performed, wherein the file may be in a file format defined by the merchant's point-of-sale (POS) system. Thus, the self-service checkout server 106 may be configured to include hardware and/or software compatible with such file formats. In addition, some merchants may manually enter such data, for example, into a merchant web user interface (which may be a graphical user interface (GUI) provided on the self-service checkout server website). In some implementations, the merchant may be required to upload a custom file format that is defined by the self-service checkout service. It should be understood that the process can also be configured to support merchant maintenance functions and/or update operations regarding the merchant registration data, including updating item prices, adding and/or deleting an item or items, and other standard merchant POS maintenance routines and/or functions and the like. Lastly, in some embodiments the self-service server stores 206 all of the merchant information that was provided by the merchant in the database 107.

FIG. 2B is a flowchart illustrating a self-service checkout consumer (or customer) registration process 210 according to an embodiment. In some implementations, a consumer uses his or her mobile device to register with the self-service checkout service (while in other embodiments the consumer may utilize another type of device to register) by providing consumer registration data. In particular, the consumer navigates to a consumer mobile device self-service checkout registration web page (not shown) provided by the self-service checkout server 106 and provides consumer registration data that includes consumer identification data such as the consumer's name and billing address, mobile device identification data (for example, a mobile telephone number, device serial number, and/or email address) and payment account data, such as a primary account number (or "PAN") associated with one or more of the consumer's payment accounts. A PAN is used herein to refer to a number of digits (or characters) which identify a payment account issued by an issuer to a consumer. For example, in some embodiments a payment account is a credit account which is issued by a financial institution pursuant to the MasterCard International Incorporated rules, and the PAN may be a twelve to nineteen-digit string that identifies both the issuer (which may be based on the first few digits of the string, for example, the first five to ten digits) and the payment account number at the issuer. The PAN is typically utilized to route and process transactions that involve the payment card and the payment card account. Those skilled in the art will appreciate that other primary account number schemes and formats may be used in conjunction with embodiments described herein. In some implementations, the consumer may enter a plurality of payment accounts (for example, by providing a plurality of PANs) that could be accessed to purchase goods or services from a merchant. In addition, mobile device identification data, such as a model number and/or serial number (or other mobile device identifier), may be provided by the consumer, or may be automatically obtained (for example, when the consumer uses his or her mobile device to register for the self-service checkout service) by the self-service checkout server via the registration process.

Referring again to FIG. 2B, once all of the required data has been provided, the self-service checkout server 106 stores 214 the consumer data, for example, in the database 107 and transmits 216 a self-service checkout application to the consumer's mobile device for installation thereon. In some embodiments, the self-service checkout application is download to and installed on the consumer's smartphone, such as an iPhone™, a Windows-based phone, or an Android-based phone (or other type of mobile device such as a personal digital assistant (PDA), an iPad™, a portable music player such as an iPod™, and the like), that has been registered for a self-service checkout account. In addition, in some implementations the self-service checkout service (including the mobile device application) is provided by a payment card issuer (such as MasterCard International Incorporated).

Figure 3:
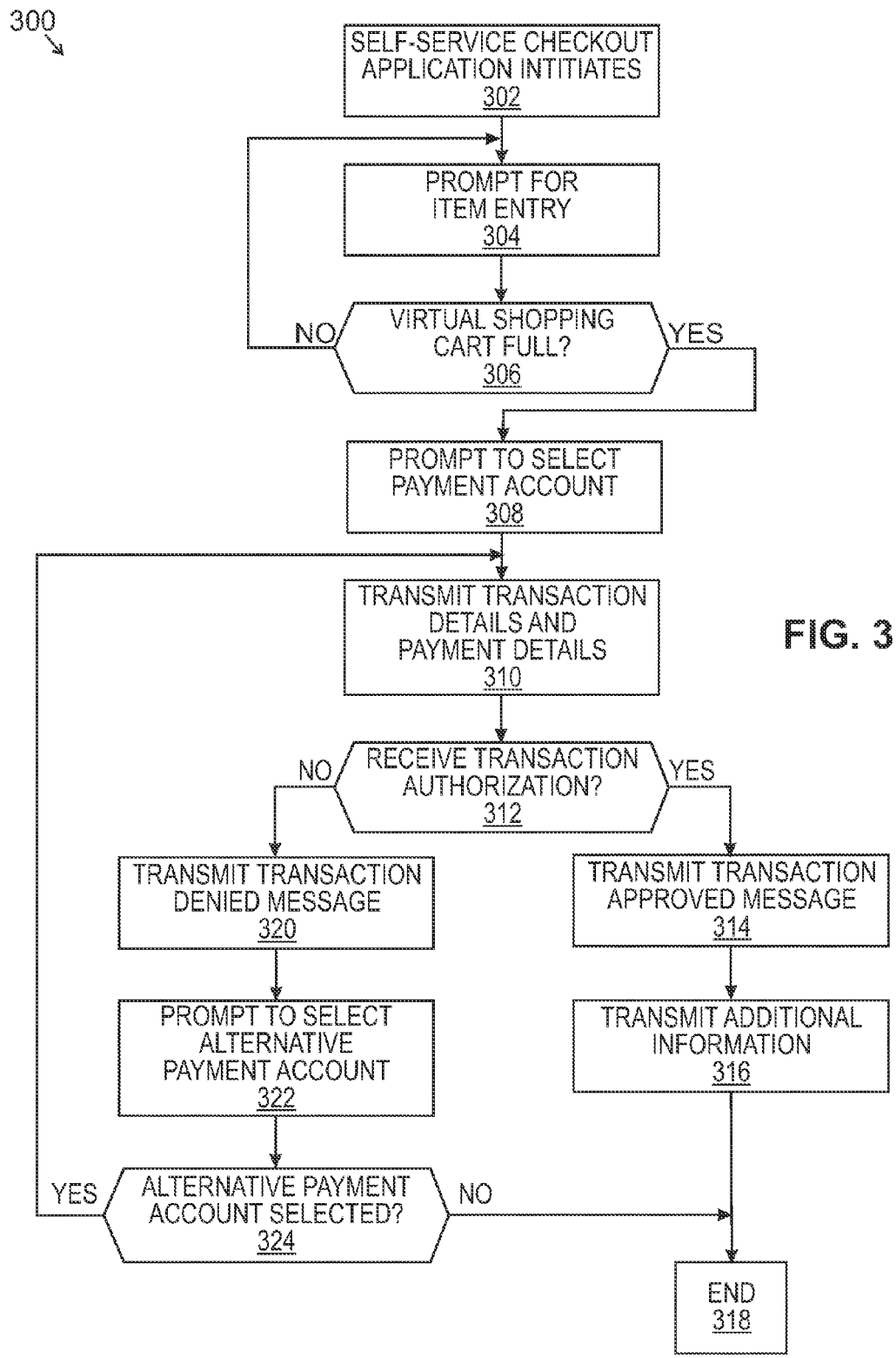
FIG. 3 is a flowchart illustrating a self-service checkout process according to an embodiment of the invention.

FIG. 3 is a flowchart illustrating a self-service checkout process 300 according to an embodiment. In some embodiments, the self-service checkout application was downloaded from the self-service checkout server and stored in a memory (not shown) of the consumer's mobile device. The self-service checkout application may include instructions configured, in some implementations, to automatically recognize a merchant location, for example, via GPS functionality of the mobile telephone when the consumer enters the merchant's store location. (As explained above, during the registration process merchants may enter the locations (coordinates, such as longitude and latitude data) of their retail stores so that a GPS application running on a consumer's mobile device can operate to automatically recognize the merchant's store.) Alternately, a consumer can manually select the shopping location (for example, if GPS data is unavailable) to initialize the self-service checkout application to run on his or her mobile device. In either case, the self-service checkout application is initiated 302 on the consumer's mobile device when the consumer is in the merchant's store. A user interface (not shown) may be displayed on the display screen of the consumer's mobile device which functions to aid the consumer in shopping and in conducting a purchase transaction.

Referring again to FIG. 3, the self-service checkout application prompts 304 the consumer to provide item information for addition to a virtual shopping cart. The prompt may take the form of a graphical user interface (GUI) that prompts the consumer to list the merchandise (goods or services) that are selected for purchase by the consumer. In some embodiments, the list may be automatically generated by consumer utilizing his or her mobile device to scan a UPC (or other standard barcode) label that is affixed to or printed on an item by using functionality available on his or her mobile device. For example, many smartphones include a camera and an appropriate application or software that permits the camera to scan a barcode and obtain information therefrom. In some implementations, the barcode data is automatically transmitted to the self-service checkout server, which then obtains an item name, the price, the item description, and/or other attributes of the merchandise selected for purchase by the consumer from, for example, the database 107 (which data was previously supplied by the merchant during the registration process and/or updated by the merchant in a subsequent process). The merchandise data can then be automatically downloaded from the self-service checkout server 106 to the consumer's mobile device and listed in the virtual shopping cart. This occurs at the same time as the consumer places the physical merchandise (or item) into the physical shopping cart in the store.

The self-service checkout application may also be configured to image a price look-up (PLU) code affixed to an item and have that image matched by the self-service checkout server so that the price, description and other attributes of the item can be downloaded and then automatically listed in the virtual shopping cart. Alternately, in some embodiments the consumer manually enters one or more items and their prices by observing the name, description, or PLU code displayed on signage, for example, in the merchant's store (for example, PLU code labels are typically affixed to fruits, vegetables and/or other produce) that are typically found on shelves that hold and/or display the goods for sale in the store. In addition, items that are required to be purchased by weight (for example, bananas and/or tomatoes) may require the consumer to confirm the weight via a snapshot of the item as it is being weighed on a scale in the retail store, for example, or by manual data entry by the consumer that might require additional, physical verification before exiting the retail store.

Referring again to FIG. 3, if the consumer indicates 306 that the virtual shopping cart is not yet full, then the application branches back to step 304 and continues to prompt the consumer to enter item information. However, if the consumer indicates 306 that he or she is finished shopping (i.e., the virtual shopping cart is full, meaning that the consumer will not add any further items to the physical shopping cart), then the self-service checkout application prompts 308 the consumer to select a payment account for the purchase transaction. In some cases, a payment account is automatically selected (which may have been, for example, designated as a default payment account by the consumer during the registration process, or may have been designated as the payment account to utilize when shopping at that merchant's store). In some embodiments, the consumer may select a payment account to use from a plurality of payment accounts that were registered by the consumer with the self-service checkout service. Next, transaction details (the list of items in the virtual shopping cart), and payment details are transmitted 310 to the gateway server 120 (which may be a central server).

In some embodiments, the self-service checkout server 106 transmits the entire contents, a transaction summary and payment details to the gateway server 120 via a structured data format (e.g. XML or JSON) and web protocol (HTTP). The central server 120 may be operably connected via a secure connection to a payment network 122. The term "payment network" as used herein refers to one or more networks that are used to process a payment transaction, which may include one or more server computers. An example of a payment network is the BankNet® processing network operated by MasterCard International Incorporated, the assignee of the present application. Those skilled in the art will appreciate that other networks may also be used to facilitate the authorization, clearing and settlement of payment transactions as described herein. Thus, in an implementation, the self-service checkout service (which may be hosted, for example, by MasterCard International Incorporated) functions to obtain all of the shopping item data and payment account data from the consumer's mobile device, generates a purchase transaction authorization request, routes that purchase transaction authorization request to the central server 120 for processing, receives an authorization response, and then provides the authorization response to both the consumer (via the consumer's mobile device) and to the merchant (via a merchant server, for example, one of the merchant servers 112, 114 or 116 of FIG. 1).

In some implementations, the self-service checkout server functions to route the purchase transaction details to the proper merchant for "business as usual" payment processing and any additional verification. For example, with regard to FIG. 1, the self-service checkout server 106 may route the purchase transaction details to merchant2 server 114 so that the merchant can process the consumer's payment transaction via standard payment processing (for example, by utilizing a payment acquiring process). In this case, merchant2 server 114 transmits a purchase authorization request to the payment network 122 via the gateway server 120, and then receives a response in the form of either a purchase transaction authorization or a purchase transaction denial. The merchant2 server then transmits that response to the self-service checkout server 106 via the Internet 104 for forwarding to the consumer's mobile device 102 or 108, wherein further processing may or may not occur in accordance with the methods described herein.

Referring again to FIG. 3, if in step 312 a transaction approved message is received 312 then the self-service checkout server transmits 314 a transaction approved notification for display on the display screen of the consumer's mobile device. In addition, in some embodiments the self-service checkout server also transmits the transaction approved notification to the merchant so that the merchant may decrement a list of merchandise in the merchant's inventory systems and/or implement enhanced security and/or controls (such as a physical item check when the consumer is exiting the retail store, or having certain items checked on a scale before the consumer exits to approximate or check the weight of goods to help mitigate theft and/or fraud). Thus, in some embodiments the self-service checkout server transmits 316 additional information and/or instructions to the consumer's mobile device that is for display on the display screen. For example, instructions may be received and displayed on the consumer's mobile device that direct the consumer to perform an action before leaving the retail store. For example, instructions may be received such as: "Please proceed to the Self-Service Checkout Exit located near aisle one for a security check by store personnel". The process then ends 318.

In step 312, if the transaction has been denied, then the self-service checkout server transmits 320 a transaction denied notification for display on the display screen of the consumer's mobile device. In some embodiments, the self-service checkout application then prompts 322 the consumer to select an alternate payment account. If the consumer does select 324 an alternate account, then the process branches back to step 310 wherein the details of the transaction and the alternate payment account details are again transmitted to the merchant server for authorization. If the consumer does not select 324 an alternate payment account then (after a predetermined time has elapsed) the process ends 318.

Figure 4:
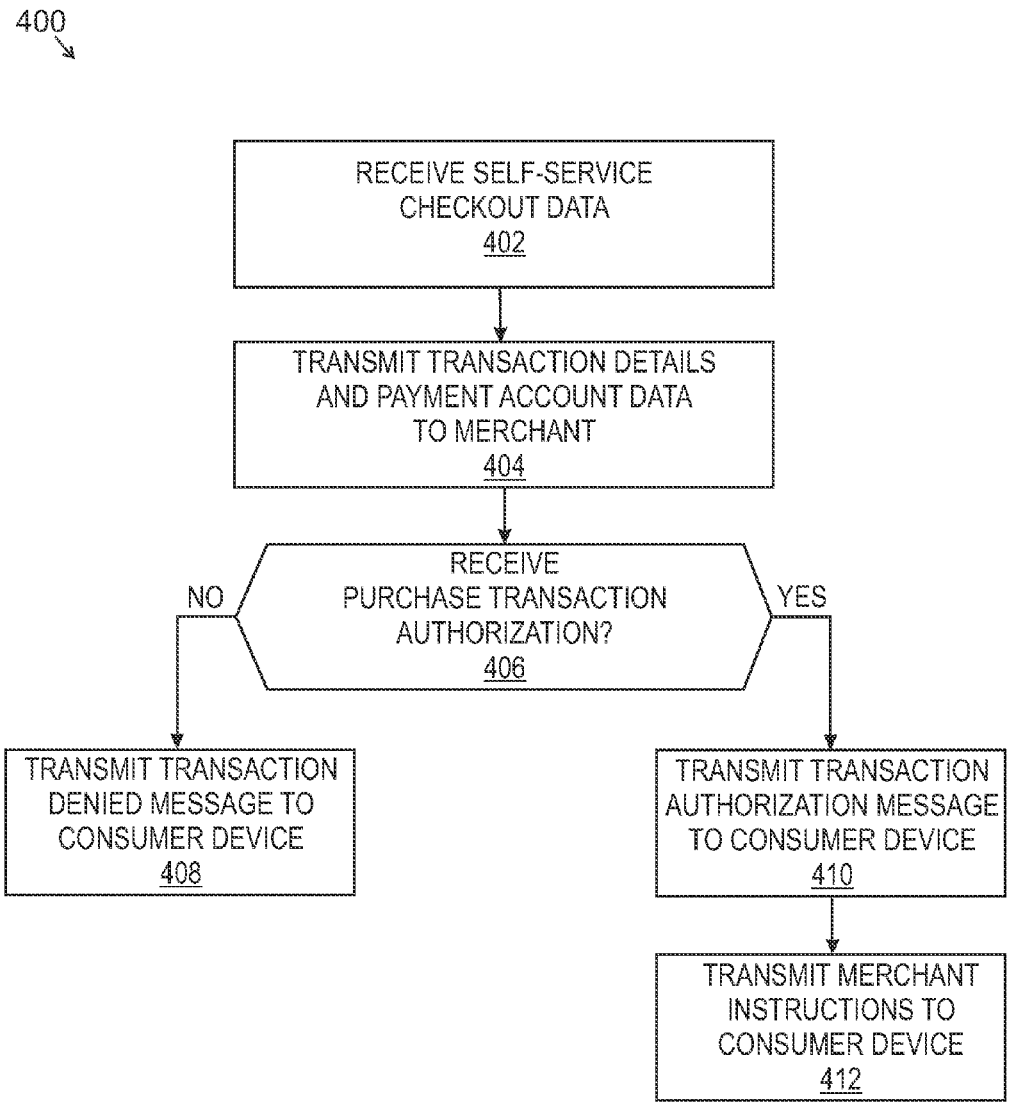
FIG. 4 is a flowchart illustrating a self-service checkout process from the point of view of a self-service checkout server according to an embodiment of the invention.

FIG. 4 is a flowchart illustrating a self-service checkout process 400 from the point of view of the self-service checkout server 106 according to an embodiment. The self-service checkout server receives 402 checkout data from a consumer's mobile device that includes identity data of the merchant's store, transaction details and the selection of a payment account. The self-service checkout server then transmits 404 the transaction details and payment account data to a merchant for purchase transaction authorization. If a purchase transaction authorization is not received 406, then a transaction declined message is transmitted 408 to the consumer's mobile device. However, if a purchase transaction authorization is received 406, then the self-service checkout server transmits 410 a purchase transaction authorization message to the consumer's mobile device. In some embodiments, the self-service checkout server also transmits 412 merchant instructions to the consumer's mobile device. The merchant instructions may direct the consumer to take action, for example, by explaining that the consumer should exit the retail store in a particular manner (i.e., the consumer may be directed to go to a designated exit whereby store personnel can conduct a visual search of the items that the consumer purchased and has in his or her possession).

Figure 5:
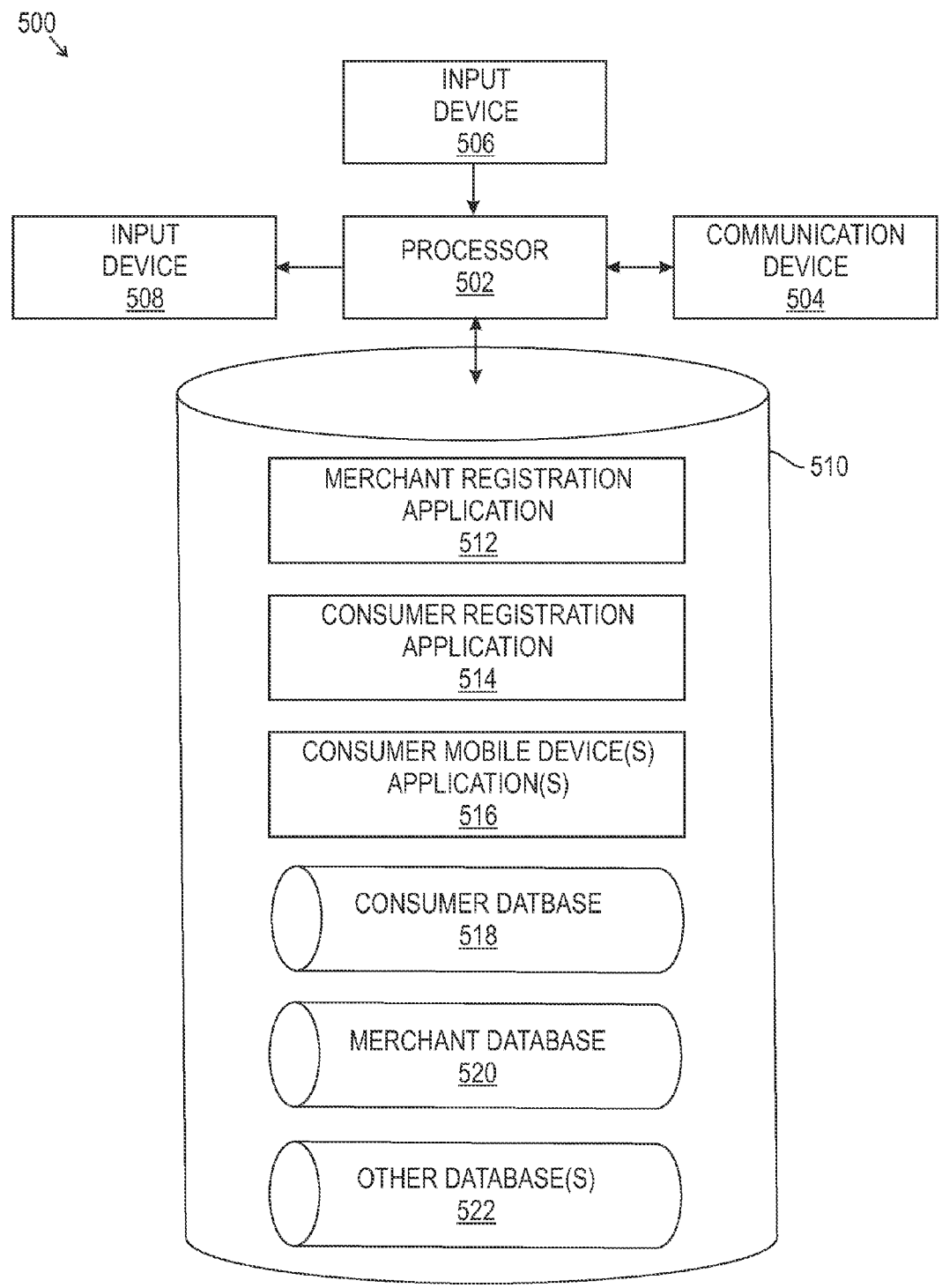
FIG. 5 is a block diagram of a self-service checkout server computer according to an embodiment of the invention.

FIG. 5 is a block diagram of a self-service checkout server computer 500 according to an embodiment. The self-service checkout server computer 500 may be conventional in its hardware aspects but may be controlled by software to cause it to operate in accordance with aspects of the methods presented herein. In particular, the self-service checkout server computer 500 may include a computer processor 502 operatively coupled to a communication device 504, an input device 506, an output device 508, and a storage device 510.

The computer processor 502 may constitute one or more conventional processors manufactured by companies such as Intel Corporation and the like. Processor 502 operates to execute processor-executable steps, contained in program instructions described herein, so as to control the self-service checkout server computer 500 to provide desired functionality.

Communication device 504 may be used to facilitate communication with, for example, other devices (such as for receiving data from a merchant device and/or a consumer mobile device, and for transmitting data to a merchant server and/or to a Smartphone or to an iPad™ tablet computer of the consumer). Communication device 504 may also, for example, have capabilities for engaging in data communications over conventional computer-to-computer data networks, including the Internet, in a wired or wireless manner. Such data communications may be in digital form and/or in analog form.

Input device 506 may comprise one or more of any type of peripheral device typically used to input data into a computer. For example, the input device 506 may include a keyboard and a mouse and/or a touchpad that may be used, for example, by a systems engineer or other personnel authorized to, for example, perform server computer system maintenance or other task. The output device 508 may comprise, for example, conventional output components such as a display and/or a printer.

Storage device 510 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "computer readable medium", "memory", "storage", or"storage medium".

Storage device 510 stores one or more programs for controlling processor 502. The programs comprise program instructions that contain processor-executable process steps of the self-service checkout server computer 500, including, in some cases, process steps that constitute processes provided in accordance with principles of the processes presented herein.

The programs may include a merchant application 512 that manages a process by which merchants register for the self-service checkout service and maintains inventory lists regarding the products and/or merchandise available in one or more retail store locations. The merchants may self-register by accessing the self-service checkout web page that includes a merchant interface for providing required information. The programs may also include a consumer application that manages a process wherein consumers register themselves and their mobile devices with the self-service checkout server computer 500, and that permits the consumer to download a self-service checkout application to his or her mobile device. In some embodiments, the self-service checkout registration process may allow consumers to register themselves by accessing, for example via their mobile telephone or tablet computer, a suitable web page hosted by the self-service checkout server computer 500. As mentioned earlier, the information obtained from the consumer during the registration process may include the consumer's name, a primary payment card account number (PAN), and a mobile telephone number (and/or other mobile identifier).

The storage device 510 may also store a consumer mobile device application 516 for downloading by the consumer to his or her mobile device for use while shopping in the merchant's retail store location. In some implementations, the consumer mobile application 516 includes a virtual shopping cart component, a product or item identifier component, a product or item information retrieval component, and a self-service checkout component. The details concerning operation of these components have been discussed above.

The storage device 510 may also include a consumer database 518, a merchant database 520, a products database 522 and other database(s) 524. Each of these databases may be maintained by the self-service checkout server computer 500 on the storage device 510.

The application programs of the self-service checkout server computer 500, as described above, may be combined in some embodiments, as convenient, into one, two or more application programs. Moreover, the storage device 510 may store other programs or applications, such as one or more operating systems, device drivers, database management software, web hosting software, and the like.

Accordingly, through use of the self-service checkout system, a merchant has an opportunity to provide relevant product data and rules and to facilitate and enhance a consumer's shopping experience. The shopping experience is enhanced as the consumer adds items to a virtual shopping cart that may be displayed on his or her mobile device in conjunction with selecting the item at the store. The consumer utilizes an intuitive mobile device application to load a virtual shopping cart on his or her mobile while shopping in the merchant's store, and uses the same mobile device application to easily and quickly checkout without having to queue up in a line behind other consumers making purchases at a checkout counter in the store.

As the term "payment transaction" is used herein and in the appended claims, it should be understood to include the types of transactions commonly referred to as "purchase transactions", which may be in connection with eCommerce transactions that may involve payment card accounts and/or payment card systems.

It should be understood that the above description and/or the accompanying drawings are not meant to imply a fixed order or sequence of steps for any process referred to herein. Rather, any process described herein may be performed in any order that is practicable, including but not limited to simultaneous performance of steps indicated as sequential. In addition, in some instances steps that are depicted or described herein as being sequential may be performed in parallel in some embodiments.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A self-service checkout method, comprising:
    initializing, by a mobile device processor of a consumer's mobile device, a self-service checkout application when a GPS application running on the consumer's mobile device recognizes coordinates of a merchant store location, wherein the self-service checkout application includes merchant rules associated with the merchant store location comprising at least one rule preventing the consumer from purchasing certain items;
    displaying, by the mobile device processor on a display screen of the consumer's mobile device, a user interface to aid the consumer in shopping and conducting a purchase transaction;
    receiving, by the mobile device processor via the user interface, input data concerning at least one item selected for a purchase transaction;
    displaying, by the mobile device processor on the display screen of the consumer's mobile device, information concerning the at least one item;
    receiving, by the mobile device processor, an indication from a consumer that shopping is completed;
    transmitting, by the mobile device processor to a self-service checkout computer, checkout data for the purchase transaction comprising merchant identity data, transaction details and consumer payment account data for transmission to a merchant server associated with the merchant store location;
    receiving, by the mobile device processor from the merchant server via the self-service checkout computer, a transaction authorization message and merchant instructions; and
    displaying, by the mobile device processor on the display screen of the consumer's mobile device, the transaction authorization message and the merchant instructions, wherein the merchant instructions direct the consumer to proceed to a designated exit of the merchant store location for a security check before exiting.

2. The self-service checkout method of claim 1, further comprising, prior to initializing the self-service checkout application:
    transmitting, by the mobile device processor to a self-service checkout computer, consumer registration data comprising consumer identification data, mobile device identification data, and consumer payment account data;
    receiving, by the mobile device processor from the self-service checkout computer, a self-service checkout application; and
    installing, by the mobile device processor, the self-service checkout application in a storage device of the consumer's mobile device.

3. The self-service checkout method of claim 1, wherein receiving the input data concerning at least one item comprises prompting, by the self-service checkout application, the consumer to one of list merchandise selected for purchase or scan a label affixed to selected merchandise using functionality available with the consumer's mobile device.

4. The self-service checkout method of claim 1, further comprising, after receiving the input data concerning at least one item selected for purchase:
    transmitting, by the mobile device processor to the self-service checkout computer, the input data; and
    receiving, by the mobile device processor from the self-service checkout computer, item information associated with the at least one selected item, the item information including at least one of an item name, an item price and an item description.

5. The self-service checkout method of claim 1, wherein displaying information concerning the at least one item comprises displaying a price and a description of the at least one item.

6. The self-service checkout method of claim 1, further comprising, after receiving an indication from a consumer that shopping is completed, prompting, by the mobile device processor, the consumer to select a payment account for the purchase transaction prior to transmitting the checkout data.

7. The self-service checkout method of claim 1, further comprising, subsequent to transmitting the checkout data:
    receiving, by the mobile device processor from the self-service checkout computer, a transaction declined message; and
    displaying, by the mobile device processor on the display screen of the consumer's mobile device, a transaction denied message.

8. The self-service checkout method of claim 7, further comprising:
    displaying, by the mobile device processor on the display screen of the consumer's mobile device, a prompt to select an alternative payment account;
    receiving, by the mobile device processor, a selection of an alternative payment account; and
    transmitting, by the mobile device processor to the self-service checkout computer, the transaction details and the alternative payment account data.

9. A non-transitory computer readable medium storing instructions configured to cause a mobile device processor to:
    initialize a self-service checkout application when a GPS application recognizes coordinates of a merchant store location, wherein the self-service checkout application includes merchant rules associated with the merchant store location comprising at least one rule preventing the consumer from purchasing certain items;
    display a user interface on a display screen of the consumer's mobile device for receiving shopping and purchase transaction input from a consumer;
    receive input data via the user interface concerning at least one item selected for a purchase transaction;
    display information concerning the at least one item on the display screen of the consumer's mobile device;
    receive an indication from a consumer that shopping is completed;
    transmit checkout data for the purchase transaction to a self-service checkout computer, the checkout data comprising merchant identity data, transaction details and consumer payment account data for transmission to a merchant server associated with the merchant store location;
    receive a transaction authorization message and merchant instructions from the merchant server via the self-service checkout computer; and
    display the transaction authorization message and the merchant instructions on the display screen of the consumer's mobile device, wherein the merchant instructions direct the consumer to proceed to a designated exit of the merchant store location for a security check before exiting.

10. The computer readable medium of claim 9, further comprising, prior to the instructions for initializing the self-service checkout application, instructions configured to cause the mobile device processor to:
    transmit consumer registration data to the self-service checkout computer, the consumer registration data comprising consumer identification data, mobile device identification data, and consumer payment account data;
    receive a self-service checkout application from the self-service checkout computer; and
    install the self-service checkout application in a memory of the consumer's mobile device.

11. The computer readable medium of claim 9, wherein the instructions for receiving the input data concerning at least one item comprises instructions configured to cause the mobile device processor to prompt the consumer to one of list merchandise selected for purchase or scan a label affixed to selected merchandise using functionality available with the consumer's mobile device.

12. The computer readable medium of claim 9, further comprising, subsequent to the instructions for receiving the input data concerning at least one item, instructions configured to cause the mobile device processor to
    transmit the input data to the self-service checkout computer; and
    receive item information associated with the at least one selected item from the self-service checkout computer, the item information including at least one of an item name, an item price and an item description.

13. The computer readable medium of claim 9, further comprising, subsequent to the instructions for receiving an indication from a consumer that shopping is completed, instructions configured to cause the mobile device processor to prompt the consumer to select a payment account for the purchase transaction prior to transmitting the checkout data.

14. The computer readable medium of claim 9, further comprising, subsequent to the instructions for transmitting the checkout data, instructions configured to cause the mobile device processor to:
    receive a transaction declined message from the self-service checkout computer; and
    display a transaction denied message on the display screen of the consumer's mobile device.

15. The computer readable medium of claim 14, further comprising instructions configured to cause the mobile device processor to:
    display a prompt to select an alternative payment account on the display screen of the consumer's mobile device;
    receive a selection of an alternative payment account; and
    transmit the transaction details and the alternative payment account data to the self-service checkout computer.

16. A self-checkout service system, comprising:
    a consumer mobile device comprising a display screen, a mobile device processor and a memory storing a self-service checkout application;
    a self-service checkout server computer operably connected to the consumer mobile device;
    a gateway server operably connected to the self-service checkout server computer and to a payment network; and
    a plurality of merchant server computers operably connected to the self-service checkout server computer;

wherein the memory of the consumer mobile device comprises instructions configured to cause the mobile device processor to:

initialize a self-service checkout application when a GPS application recognizes coordinates of a merchant store location, wherein the self-service checkout application includes merchant rules associated with the merchant store location comprising at least one rule preventing the consumer from purchasing certain items;

display a user interface on the display screen of the consumer mobile device for receiving shopping and purchase transaction input from a consumer;

receive input data via the user interface concerning at least one item selected for a purchase transaction;

display information concerning the at least one item on the display screen of the consumer mobile device;

receive an indication from a consumer that shopping is completed;

transmit checkout data for the purchase transaction to the self-service checkout computer for transmission to a merchant server associated with the merchant store location, the checkout data comprising merchant identity data, transaction details and consumer payment account data;

receive a transaction authorization message and merchant instructions from the merchant server via the self-service checkout computer; and display the transaction authorization message and the merchant instructions on the display screen of the consumer's mobile device, wherein the merchant instructions direct the consumer to proceed to a designated exit of the merchant store location for a security check before exiting.

17. The system of claim 16, further comprising a database operably connected to the self-service checkout server, the database storing at least one of consumer registration data and merchant registration data.

\* \* \* \* \*